(12) United States Patent
Burns

(10) Patent No.: US 8,393,584 B2
(45) Date of Patent: Mar. 12, 2013

(54) APPARATUS FOR HOLDING A PORTABLE ELECTRONIC DEVICE

(76) Inventor: Salih Maurice Burns, Hamilton (BM)

( * ) Notice: Subject to any disclaimer, the term of this patent is extended or adjusted under 35 U.S.C. 154(b) by 164 days.

(21) Appl. No.: 13/112,129

(22) Filed: May 20, 2011

(65) Prior Publication Data

US 2012/0292463 A1 Nov. 22, 2012

(51) Int. Cl.
*F16L 3/00* (2006.01)
(52) U.S. Cl. ............... 248/121; 248/160; 248/205.5; 248/309.1; 248/313
(58) Field of Classification Search ............ 248/125.8, 248/160, 121, 122.1, 125.1, 125.3, 205.5, 248/206.2, 309.1, 313, 316.2, 316.3, 316.1, 248/314; 340/568.2, 568.8, 693.9; 362/382, 362/410
See application file for complete search history.

(56) References Cited

U.S. PATENT DOCUMENTS

| | | | | |
|---|---|---|---|---|
| 2,667,323 | A * | 1/1954 | Mason | 248/298.1 |
| 3,833,196 | A | 9/1974 | Protzman | |
| 5,187,744 | A * | 2/1993 | Richter | 379/449 |
| 5,392,350 | A * | 2/1995 | Swanson | 379/446 |
| 5,396,556 | A | 3/1995 | Chen | |
| 5,860,824 | A | 1/1999 | Fan | |
| 5,911,395 | A * | 6/1999 | Hussaini | 248/206.3 |
| 6,062,518 | A * | 5/2000 | Etue | 248/231.21 |
| 6,366,672 | B1 | 4/2002 | Tsay | |
| 6,478,276 | B1 | 11/2002 | Louh | |
| 6,966,533 | B1 | 11/2005 | Kalis et al. | |
| 7,062,300 | B1 | 6/2006 | Kim | |
| 7,292,881 | B2 * | 11/2007 | Seil et al. | 455/575.1 |
| 7,320,450 | B2 * | 1/2008 | Carnevali | 248/160 |
| 7,624,955 | B2 | 12/2009 | McGill | |
| 7,684,694 | B2 | 3/2010 | Fromm | |
| 8,052,311 | B2 * | 11/2011 | Xhunga | 362/387 |
| 8,242,906 | B2 * | 8/2012 | Fawcett | 340/568.2 |
| 2004/0023633 | A1 | 2/2004 | Gordon | |
| 2004/0211868 | A1 * | 10/2004 | Holmes et al. | 248/231.71 |
| 2005/0098692 | A1 | 5/2005 | Yang | |
| 2005/0236545 | A1 * | 10/2005 | Seil et al. | 248/311.2 |
| 2005/0265711 | A1 | 12/2005 | Heibel | |
| 2006/0111076 | A1 | 5/2006 | Davie et al. | |
| 2009/0033492 | A1 * | 2/2009 | Rapp et al. | 340/568.8 |
| 2010/0301188 | A1 * | 12/2010 | Schimelfenyg | 248/447.2 |
| 2012/0026684 | A1 * | 2/2012 | Matthews | 361/679.58 |

* cited by examiner

*Primary Examiner* — Anita M King
(74) *Attorney, Agent, or Firm* — Webb IP Law Group; Jason P. Webb; Danny Y. H. Cheng

(57) ABSTRACT

An apparatus for holding a portable electronic device. The apparatus includes a base having a storage compartment. The base includes a neck cavity. The apparatus includes an attachment member extending from the base and configured to couple to another object. The attachment member includes a suction cup. The apparatus includes a neck extending from the neck cavity of the base; wherein when the neck is retracted substantially fits within the neck cavity. The neck includes a plurality of frustoconical nested members configured to extend from the neck cavity or retract therein. The apparatus includes a mount coupled to a distal end of the neck and configured to couple to a portable electronic device. The mount includes an actuation device configured to actuate the portable electronic device. The apparatus includes a remote control configured to actuate a portable electronic device.

18 Claims, 4 Drawing Sheets

APPARATUS FOR HOLDING A PORTABLE ELECTRONIC DEVICE

BACKGROUND OF THE INVENTION

1. Field of the Invention

The present invention relates to mounts, specifically an apparatus for holding a portable electronic device.

2. Description of the Related Art

A camera or other portable electronic device may be mounted on a tripod; a tripod is a portable three-legged frame, used as a platform for supporting the weight and maintaining the stability of some other object. A tripod provides stability against downward forces, horizontal forces and moments about the vertical axis. The positioning of the three feet away from the vertical centre allows the tripod better leverage for resisting lateral forces. Tripods have the disadvantage of being heavy and bulky although they can be used with large equipment. Tripods are used for both motion and still photography to prevent camera movement and provide stability. Some improvements have been made in the field. Examples of references related to the present invention are described below in their own words, and the supporting teachings of each reference are incorporated by reference herein:

U.S. Pat. No. 7,684,694, issued to Fromm, discloses a camera support assembly including an elongated support, such as a extensible support, which support extends between a base assembly and a handgrip, whereby a user of the camera may secure a camera to the base assembly and, while holding the handgrip, position the camera a distance away, which may be greater than arms length, to capture a still or moving image of the user, of an obstructed scene, or of hard to reach and/or unsafe areas.

U.S. Pat. No. 7,624,955, issued to McGill, discloses a support stand includes a base and a mounting post that is collapsible into the base. The support stand can be extremely compact and nearly flat with a very small height. The support stand also is very easy to use and can be quickly set up and utilized with a camera or other device to be mounted thereon.

U.S. Pat. No. 6,366,672, issued to Tsay, discloses an improved mobile phone holder includes a phone seat body adapted for clamping and holding a mobile phone, an adapter seat provided at a lower end portion of the phone seat body adapted for electrical connection with a car's power source, and a receiving seat coupled onto the phone seat body and being provided with a connector for insertable connection with the mobile phone to permit electrical connection to cause internal paths to charge the mobile phone and to allow use of the mobile phone in a hand-free state. The receiving seat is replaceable with receiving seats having different connectors to adapt to different models of mobile phones. A shaft is disposed between an insertable connecting seat and the phone seat body to pivotally connect an arm rod for interconnection. Each seat rod and the shaft are formed with inter-engageable toothed rims in corresponding positions. A compression spring is disposed between the other end of the shaft and the corresponding end of the seat rod to push one end of the shaft to cause the shaft to displace so that the toothed rims disengage from each other to allow relative rotation so as to permit change of relative angles thereof. When released, the compression spring's resetting force causes the shaft to return to its original state with the toothed rims engaged, thereby facilitating adjustment operation, enhancing stability, and preventing displacement and loosening of the mobile phone holder when subjected to vibration.

U.S. Pat. No. 5,396,556, issued to Chen, discloses a cellular phone securing device has a fixing unit and a flexible tube, a linkage rod and a phone securing mount. The fixing unit is provided with a horizontal slide board, and a vertical contact member and a pair of bolts. The slide board and the contact member are one way adjustably limited in place and the bolts are selectively attached to the underside of the fixing unit.

In mounting of the securing device, the slide board and the contact member are adjusted to abut against a windshield of a vehicle and the bolts are in abutment with the edges of outlets of a ventilation system of the vehicle whereby the bolts and the slide board and the contact member constitute a three-point supporting of the fixing unit. The phone securing mount is adhered to a flat place of the front console board of the vehicle.

U.S. Pat. No. 3,833,196, issued to Protzman, discloses a camera support adapted to be attached to an automobile window or similar, plate-like surface. The support includes a base frame, a pair of clips adapted to engage over an upper edge of a window, and a pair of downwardly projecting legs adapted to engage the inner surface of the window. A camera platform is mounted on the base frame in a manner that provides for movement of the camera platform about at least two mutually perpendicular axes.

The inventions heretofore known suffer from a number of disadvantages which include being difficult to use, being unduly complex, being expensive, being limited in motion, being limited in adjustability, being too bulky, being difficult to set up, being cumbersome to use, being limited in use, failing to permit a user to aim a camera in any direction, having only a single mode, not holding a camera securely, not being stable, requiring a user to be at the location of the object during use, and failing to couple to other objects/surfaces.

What is needed is an apparatus for holding a portable electronic device that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available apparatuses for holding a portable electronic device. Accordingly, the present invention has been developed to provide a portable apparatus for holding an electronic device.

According to one embodiment of the invention, there is an apparatus for holding a portable electronic device. The apparatus may include a base that may have a storage compartment. The base may include a neck cavity. The storage compartment may be disposed within the base, and may be adjacent the neck cavity. The apparatus may include an attachment member that may extend from a bottom surface of the base and may be configured to couple the base to another object. The attachment member may include a suction cup. The attachment member may be disposed on an opposite side of the base relative to the neck. The apparatus may include a neck that may extend from the neck cavity of the base; wherein the neck may be retractable, and in a retractable mode may substantially fit within the neck cavity. The neck may include a plurality of frustoconical nested members that may be configured to extend from the neck cavity and/or retract therein. The neck, in the retractable mode, may be disposed adjacent the base. The apparatus may include a mount that may be coupled to a distal end of the neck and/or may be configured to couple to a portable electronic device. The mount may include an actuation device that may be configured to actuate a portable electronic device. The apparatus may include a remote control that may be configured to actuate a portable electronic device.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
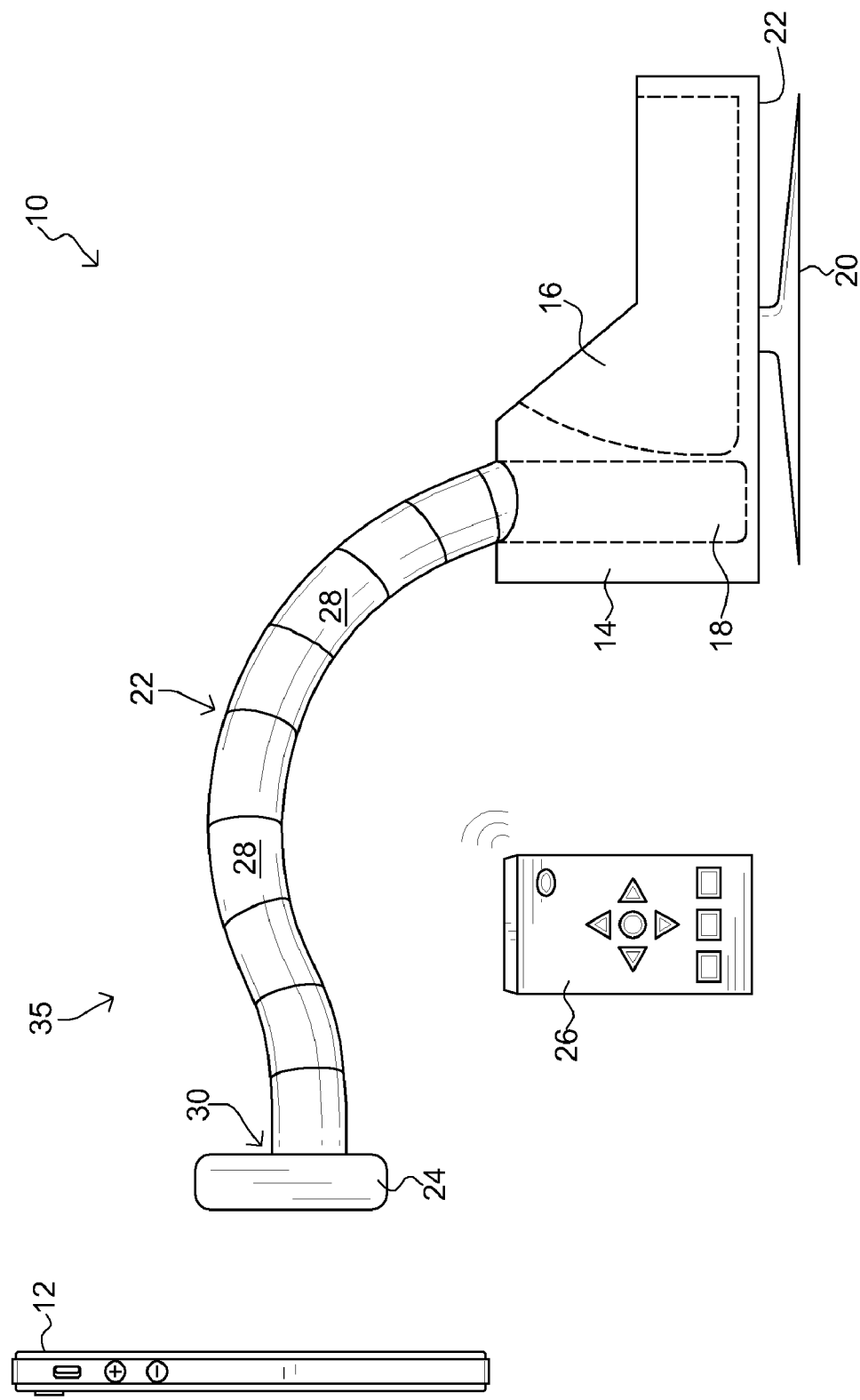
FIG. 1 is a side elevational view of an apparatus for holding a portable electronic device, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of programmable or executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. As those skilled in the art will appreciate, any computers discussed herein may include an operating system (e.g., Windows Vista, NT, 95/98/2000, OS2; UNIX; Linux; Solaris; MacOS; and etc.) as well as various conventional support software and drivers typically associated with computers. The computers may be in a home or business environment with access to a network. In an exemplary embodiment, access is through the Internet through a commercially-available web-browser software package.

The present invention may be described herein in terms of functional block components, screen shots, user interaction, optional selections, various processing steps, and the like. Each of such described herein may be one or more modules in exemplary embodiments of the invention. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, AJAX, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units and/or modules. Being "in communication" refers to any manner and/or way in which functional units and/or modules, such as, but not limited to, computers, laptop computers, PDAs, modules, and other types of hardware and/or software, may be in communication with each other. Some non-limiting examples include communicating, sending, and/or receiving data and metadata via: a network, a wireless network, software, instructions, circuitry, phone lines, internet lines, satellite signals, electric signals, electrical and magnetic fields and/or pulses, and/or so forth.

As used herein, the term "network" may include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 is a side elevational view of an apparatus for holding a portable electronic device, according to one embodiment of the invention. There is shown an apparatus 10 for holding a portable electronic device 12. The apparatus 10 provides a stable and compact mounting for a portable electronic device 12 such that the portable electronic device 12 may be oriented in a plethora of positions and angles. Accordingly, the portable electronic device 12 may be utilized in manners not convenient and/or not possible by hand. Non-limiting examples of portable electronic devices include: Apple iPhones and iPads manufactured by Apple, 1 Infinite Loop, Cupertino, Calif., 95014; Blackberrys manufactured by Research in Motion, 295 Phillip Street, Waterloo, Ontario, CA, N2L 3W8; Android manufactured by Google Inc., 1600 Amphitheatre Parkway, Mountain View, Calif., 94043; a portable electronic device as described in U.S. Pat. No. 7,136,685, issued to Chiang; a portable communication device as described in U.S. Pat. No. 6,177,950, issued to Robb; a portable electronic device as described in U.S. Pat. No. 7,165,726, issued to Tsai, which are incorporated for their supported teachings herein.

The illustrated apparatus 10 includes a base 14 configured to provide a stable platform for the portable electronic device 12. The base 14 includes a storage compartment 16 configured to store items, disposed in the interior of the base 14. The base 14 includes a neck cavity 18 disposed within the base 14, adjacent the storage compartment 16, and configured to support a neck 22. The illustrated neck cavity 18 is inset vertically into an end of the base 14 and is sized and shaped to contain the neck 22. The neck cavity may include one or more devices, structures or the like that may couple with the neck, interact with the neck, mate with the neck, or the like such that the neck may be coupled to the cavity in a manner that restricts free removal therefrom. As a non-limiting example, the neck cavity may include a flange extending inwardly at a top end of the neck cavity that engages a flange extending outwardly from a bottom portion of the neck, such that when the two flanges are in contact, the neck may not pass further out of the neck cavity. The apparatus 10 includes an attachment member 20 extending from a bottom surface 22 of the base 14 and configured to couple the base 14 to another object. The illustrated attachment member 20 includes a suction cup 24 configured to secure to another object. The attachment member 20 may include other coupling devices including but not limited to brackets, screw plates, clips, spikes, screws, threaded coupling members, and the like and combinations thereof. The attachment member 20 is disposed on an opposite side of the base 14 relative to the neck 22.

The apparatus 10 includes a neck 22 extending from the neck cavity 18 of the base 14. The neck (gooseneck) 22 is an elongated member that is plastically deformable, such that it may be positioned in a configuration and will remain so unless further deformed. Non-limiting examples of such necks include plastic coated wires, nesting cylinders, resinous cylinders and the like and combinations thereof. The neck 22 is retractable such that its effective length is able to be reduced reversibly, and when in a retractable mode substantially fits within the neck cavity 18. The illustrated neck 22 is in an extended mode 35 and includes a plurality of frustoconical nested members 28 configured to extend from the neck cavity 18 or retract therein. The frustoconical nested members 28 are configured to retract within the previous member or extend out therefrom to provide a desired length of the neck from the base. Each frustoconical nested member nests with adjacent frustoconical members in a manner that when extended the members lock into position but provide a degree of angular choice of position with respect to each other, thereby providing a stable yet plastically deformable support. The neck 22, when in the retractable mode, is disposed adjacent the base 14. The apparatus 10 includes a mount 24 coupled to a distal end 30 of the neck 22 and configured to couple to the portable electronic device 12. The illustrated apparatus 10 includes a remote control 26 configured to actuate the portable electronic device 12.

In operation of one embodiment of the invention, a user couples the suction cup, of an apparatus for holding a portable electronic device, to another object. Another object may be, but not limited to: a desk, a dashboard, a table, a wall, a chair, etc. The user extends the neck of the apparatus and couples a portable electronic device to the mount of the apparatus. The user slips the first arm and the second arm over each side of the portable electronic device, thereby coupling the portable electronic device to the mount. The user positions the portable electronic device and the device is ready for use.

Figure 2:
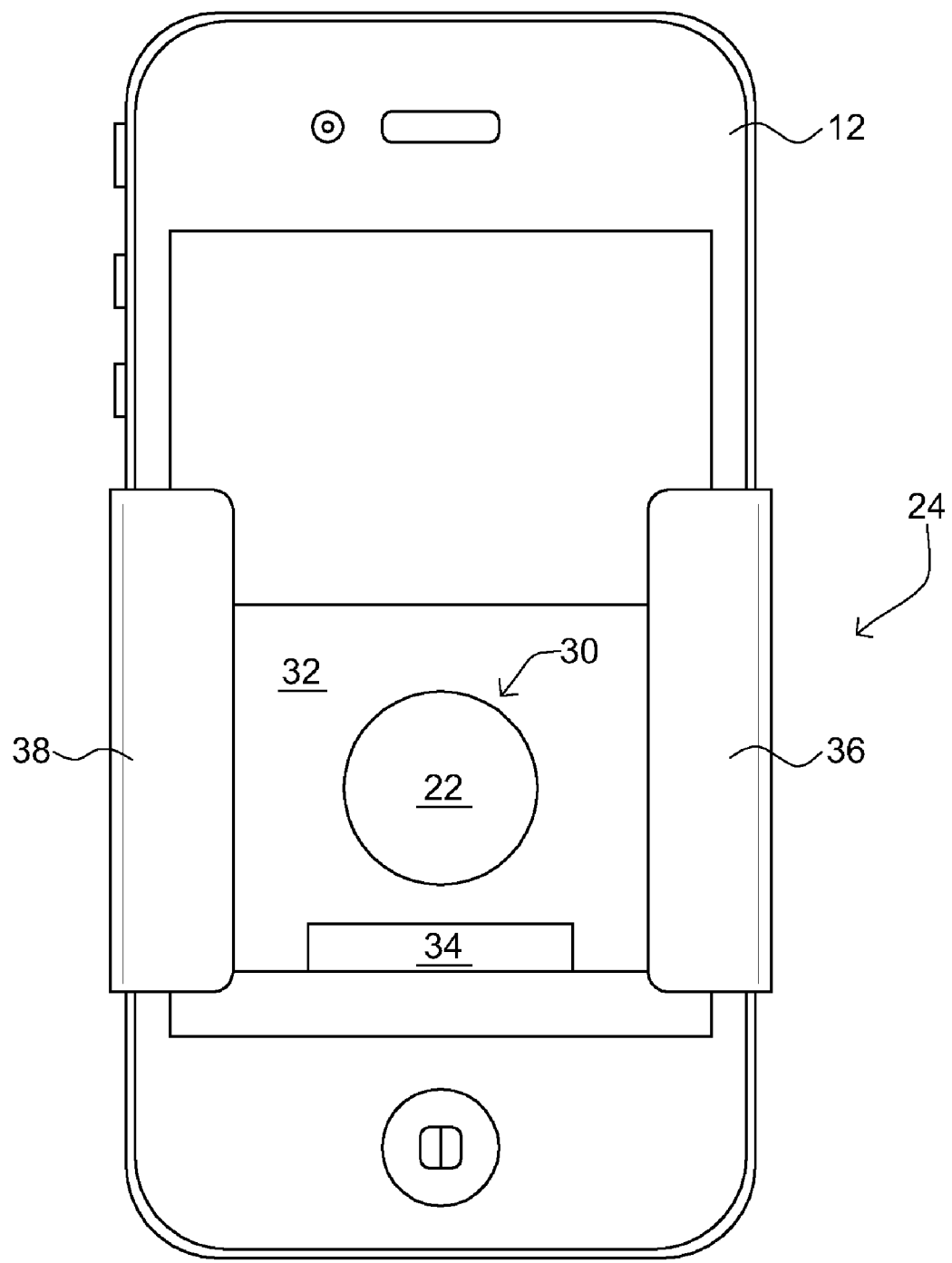
FIG. 2 is a rear view of a mount of an apparatus for holding a portable electronic device, according to one embodiment of the invention.

FIG. 2 is a rear view of a mount of an apparatus for holding a portable electronic device, according to one embodiment of the invention. There is shown a portable electronic device 12 coupled to a mount 24 of an apparatus for holding a portable electronic device 12.

The illustrated apparatus includes a neck 22 extending from a base of the apparatus. The neck 22 includes a plurality of frustoconical nested members configured to extend and retract from the base of the apparatus. The apparatus includes a mount 24 coupled to a distal end 30 of the neck 22 and configured to couple to the portable electronic device 12. The mount 24 includes a first arm 36 and a second arm 38 configured to couple to the sides of the portable electronic device 12. The first arm 36 is coupled to the second arm 38 by a flexible sheath 32 configured to expand and contract depending on the size of the portable electronic device 12. The illustrated mount 24 also includes an actuation device 34 configured to actuate the portable electronic device 12 for use.

The actuation device, according to one embodiment of the invention, may be a mechanical device configured to physically actuate the portable electronic device to actuate, such as but not limited to taking a picture or starting a recording. The mechanical device may include a power module, a control module, an actuation module and a communication module. The communication module is in communication the control module and with a remote control. The communication module is configured to receive a signal to actuate the portable electronic device. The control module and the power module is in communication with the actuation module. The control module is configured to provide operational controls to the actuation module. The actuation module is configured to actuate the portable electronic device.

The actuation device, according to one embodiment of the invention, may be a program or an application downloaded and stored on the portable electronic device, such as but not limited to applications written for and/or available at the Apple App Store by Apple, 1 Infinite Loop, Cupertino, Calif., 95014; and/or the Blackberry Market by Research in Motion, 295 Phillip Street, Waterloo, Ontario, CA, N2L 3W8; and/or the Android Market by Google Inc., 1600 Amphitheatre Parkway, Mountain View, Calif., 94043. The program may include instructions for performing the steps of a method of actuating a portable electronic device, such as but not limited to a memory resident program in communication with a network and configured to listen for an activation signal over the network and to trigger activation of a portion of a portable electronic device upon which it is stored, such as but not limited to activating a camera application to take a photograph. The program or application may be configured to receive a signal from a remote control to actuate the portable electronic device. The program or application may be configured to receive a signal from another portable electronic device in communication with the portable electronic device and configured to actuate the portable electronic device. The two portable electronic devices may be in communication with each other through the program or application. Non-limiting examples of applications include: a mobile smartphone application as described in U.S. Patent Publication No. 2010/0281475 by Jain et al.; a application program interface as described in U.S. Patent Publication No. 2007/01362576 by Sinclair et al.; an application module as described in U.S. Pat. No. 7,836,011 issued to Celik; an application software as described in U.S. Pat. No. 7,149,471, issued to Arisawa et al., which are incorporated for their supported teachings herein.

Figure 3:
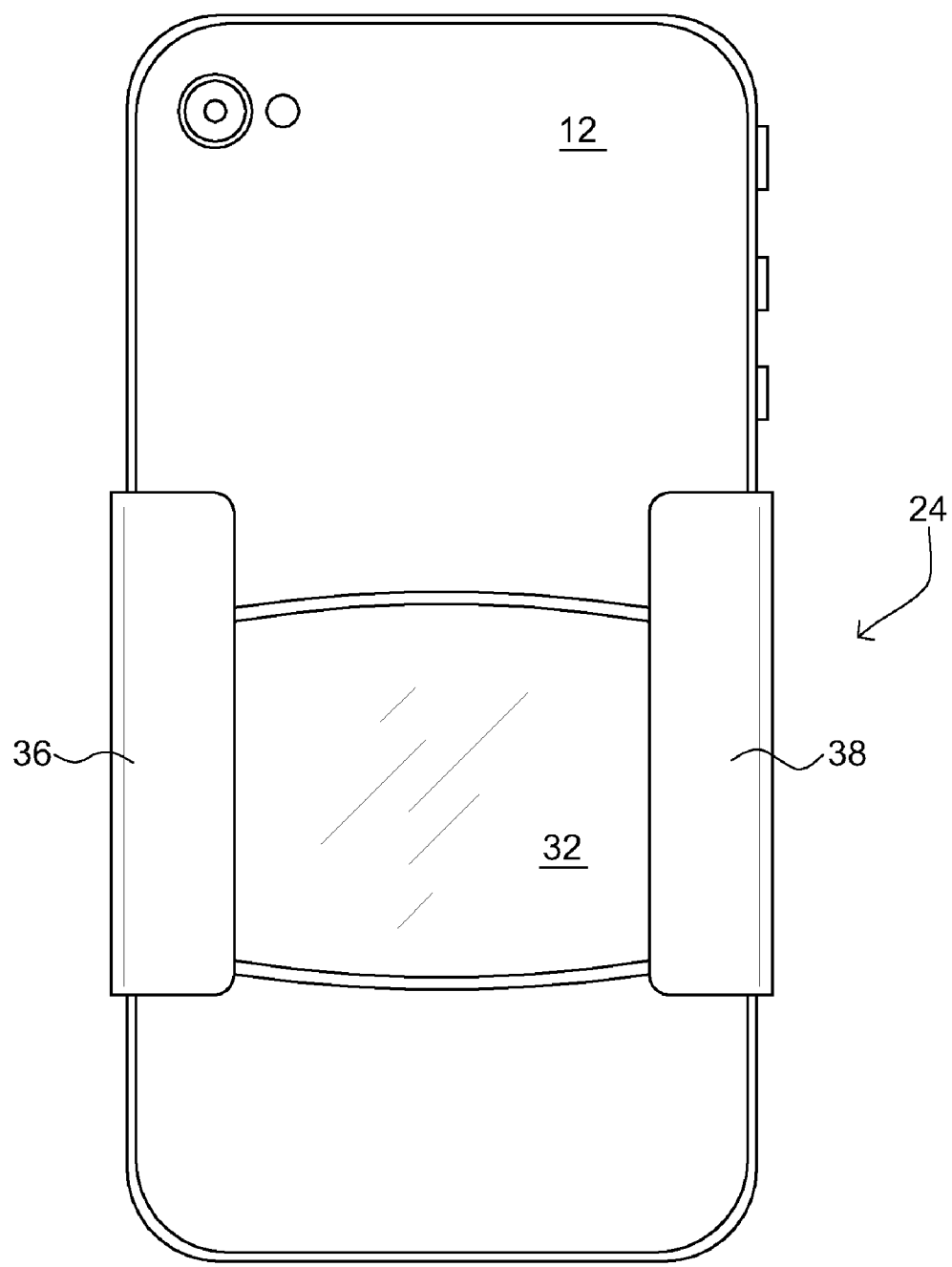
FIG. 3 is a front view of a mount of an apparatus for holding a portable electronic device, according to one embodiment of the invention.

FIG. 3 is a front view of a mount of an apparatus for holding a portable electronic device, according to one embodiment of the invention. There is shown a portable electronic device 12 coupled to a mount 24 of an apparatus for holding a portable electronic device 12.

The illustrated apparatus includes a mount 24 coupled to a distal end of a neck and configured to couple to the portable electronic device 12. The mount 24 includes a first arm 36 and a second arm 38 configured to couple to the sides of the portable electronic device 12. The first arm 36 is coupled to the second arm 38 by a flexible sheath 32 configured to expand and contract depending on the size of the portable electronic device 12.

Figure 4:
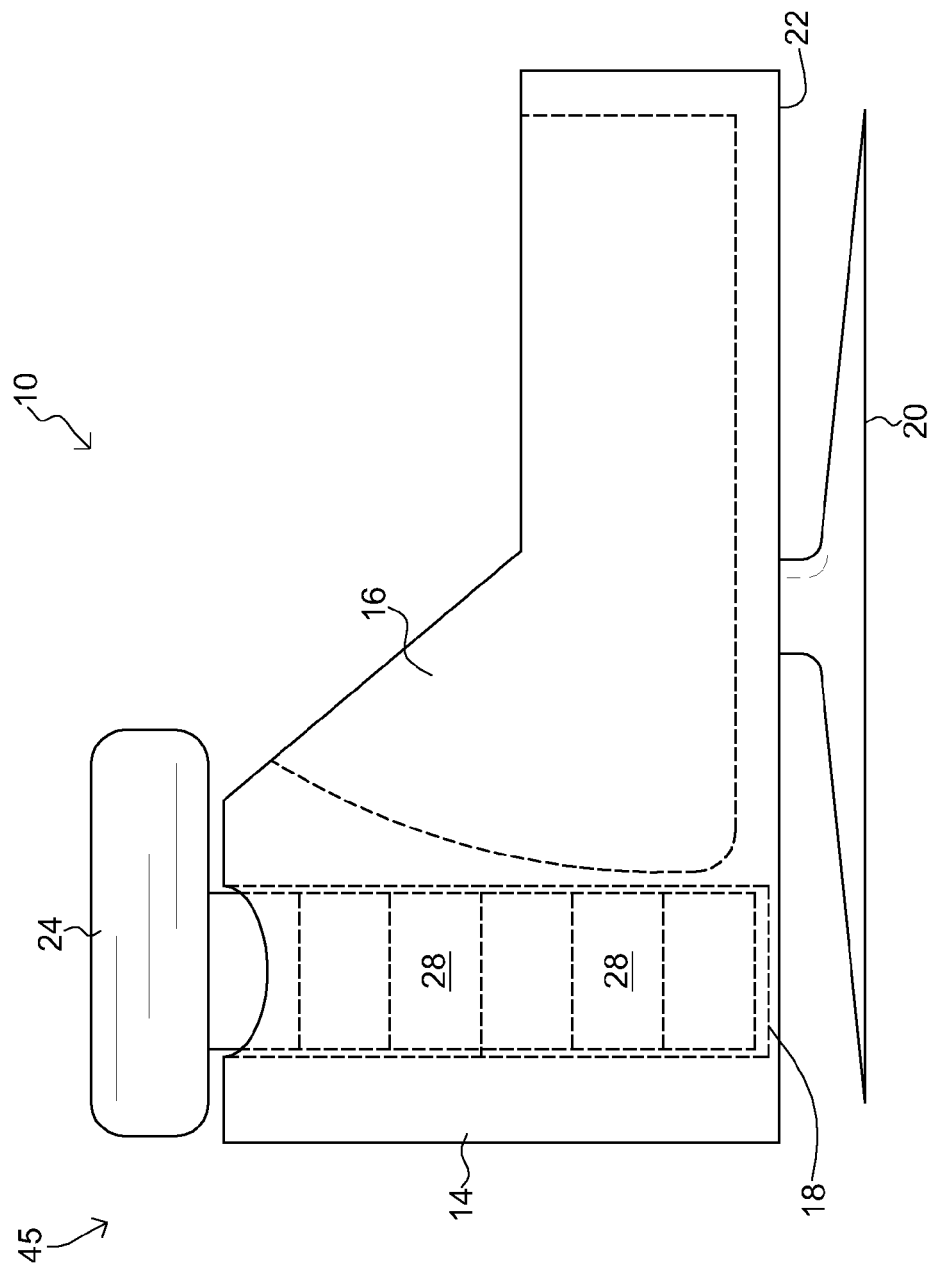
FIG. 4 is a side elevational view of an apparatus for holding a portable electronic device in a retracted mode, according to one embodiment of the invention.

FIG. 4 is a side elevational view of an apparatus for holding a portable electronic device in a retracted mode, according to one embodiment of the invention. There is shown an apparatus 10 for holding a portable electronic device in a retracted mode 45.

The illustrated apparatus 10 includes a base 14 configured to stabilize a portable electronic device. The base 14 includes a storage compartment 16 configured to store items. The illustrated storage compartment 16 is disposed about a back region of the base. The base 14 includes a neck cavity 18 disposed within the base 14, adjacent the storage compartment 16. The apparatus 10 includes an attachment member 20 extending from a bottom surface 22 of the base 14 and configured to couple the base 14 to another object. The illustrated attachment member 20 includes a suction cup 24. Non-limiting examples of an attachment member may be: a magnet, a clamp, an adhesive, a clip, a clasp, etc. The attachment member 20 is disposed on an opposite side of the base 14 relative to the neck 22. The apparatus 10 includes a neck 22 extending from the neck cavity 18 of the base 14. The neck 22 is retractable, and when in a retractable mode 45 substantially fits within the neck cavity 18. The neck 22 includes a plurality of frustoconical nested members 28 configured to extend from the neck cavity 18 or retract therein. The neck 22, when in the retractable mode 45, is retracted into the neck cavity 18 and is disposed adjacent the base 14. The apparatus 10 includes a mount 24 coupled to the neck 22 and configured to couple to a portable electronic device.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the base is substantially pyramidal-shaped, one skilled in the art would appreciate that the base may vary in size, shape, design, configuration, color, length, height, width, and still perform its intended function.

Additionally, although the figures illustrate a first arm and a second arm of a mount, one skilled in the art would appreciate that the mount may vary in size, shape, design, configuration, color, length, height, width, and still perform its intended function.

It is expected that there could be numerous variations of the design of this invention. An example is that the specifically illustrated positions, relations, orientations, and the like of the neck, neck cavity, base, suction cup, storage, and etc. may be different from what is illustrated yet still performing their intended functions.

Finally, it is envisioned that the components of the device may be constructed of a variety of materials, such as but not limited to: plastic, plastic composite, rubber, rubber composite, graphite, textiles, glass, fiber, resin, metal, metal alloys, etc, and combinations thereof and still perform its intended function.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. An apparatus for holding a portable electronic device, comprising:
    a) a base including:
       a1) a storage compartment; and
       a2) a neck cavity;
    b) an attachment member extending from a bottom surface of the base and configured to couple the base to another object;
    c) a neck extending from the neck cavity of the base; wherein the neck is retractable, and in a retractable mode substantially fits within the neck cavity; and
    d) a mount coupled to a distal end of the neck and configured to couple to a portable electronic device.

2. The apparatus of claim 1, wherein the attachment member includes a suction cup.

3. The apparatus of claim 1, wherein the neck includes a plurality of frustoconical nested members configured to extend from the neck cavity or retract therein.

4. The apparatus of claim 1, wherein the neck, in the retractable mode, is disposed adjacent the base.

5. The apparatus of claim 1, wherein the attachment member is disposed on an opposite side of the base relative to the neck.

6. The apparatus of claim 1, wherein the storage compartment is disposed within the base, adjacent the neck cavity.

7. The apparatus of claim 1, wherein the mount further includes an actuation device configured to actuate a portable electronic device.

8. The apparatus of claim 1, wherein the apparatus further includes a remote control configured to actuate a portable electronic device.

9. An apparatus for holding a portable electronic device, comprising:
    a) a base including:
       a1) a storage compartment; and
       a2) a neck cavity;
    b) an attachment member extending from a bottom surface of the base and configured to couple the base to another object;
    c) a neck extending from the neck cavity of the base; wherein the neck is retractable, and in a retractable mode substantially fits within the neck cavity; and
    d) a mount coupled to a distal end of the neck and configured to couple to a portable electronic device; wherein the mount further includes an actuation device configured to actuate a portable electronic device.

10. The apparatus of claim 9, wherein the attachment member includes a suction cup.

11. The apparatus of claim 10, wherein the neck includes a plurality of frustoconical nested members configured to extend from the neck cavity or retract therein.

12. The apparatus of claim 11, wherein the neck, in the retractable mode, is disposed adjacent the base.

13. The apparatus of claim 12, wherein the attachment member is disposed on an opposite side of the base relative to the neck.

14. The apparatus of claim 13, wherein the storage compartment is disposed within the base, adjacent the neck cavity.

15. The apparatus of claim 14, wherein the apparatus further includes a remote control configured to actuate a portable electronic device.

16. An apparatus for holding a portable electronic device, comprising:
    a) a base including:
       a1) a storage compartment; and
       a2) a neck cavity; wherein the storage compartment is disposed within the base, adjacent the neck cavity;
    b) an attachment member extending from a bottom surface of the base and configured to couple the base to another object; the attachment member includes a suction cup; wherein the attachment member is disposed on an opposite side of the base relative to the neck;
    c) a neck extending from the neck cavity of the base; wherein the neck is retractable, and in a retractable mode substantially fits within the neck cavity; wherein the neck includes a plurality of frustoconical nested members configured to extend from the neck cavity or retract therein; wherein the neck, in the retractable mode, is disposed adjacent the base; and
    d) a mount coupled to a distal end of the neck and configured to couple to a portable electronic device.

17. The apparatus of claim 16 wherein the mount further includes an actuation device configured to actuate a portable electronic device.

18. The apparatus of claim 16, wherein the apparatus further includes a remote control configured to actuate a portable electronic device.

* * * * *